(12) United States Patent
Gautheron et al.

(10) Patent No.: US 9,019,127 B2
(45) Date of Patent: Apr. 28, 2015

(54) METHOD AND DEVICE FOR DEVELOPMENT OF A SYSTEM FOR MANAGEMENT OF THE WARNINGS AND PROCEDURES ON AN AIRCRAFT

(71) Applicant: Thales, Neuilly-sur-Seine (FR)

(72) Inventors: Didier Gautheron, Toulouse (FR); Chris Deseure, Toulouse (FR); Xavier Chazottes, Toulouse (FR); Patrick Serrot, Fonsorbes (FR)

(73) Assignee: Thales, Courbevoie (FR)

( * ) Notice: Subject to any disclaimer, the term of this patent is extended or adjusted under 35 U.S.C. 154(b) by 114 days.

(21) Appl. No.: 13/868,913

(22) Filed: Apr. 23, 2013

(65) Prior Publication Data

US 2013/0280679 A1   Oct. 24, 2013

(30) Foreign Application Priority Data

Apr. 24, 2012 (FR) .................................... 12 01196

(51) Int. Cl.
| | | |
|---|---|---|
| G08B 21/00 | (2006.01) |
| B64F 5/00 | (2006.01) |
| G09B 9/16 | (2006.01) |
| G06F 17/30 | (2006.01) |
| G05B 23/02 | (2006.01) |

(52) U.S. Cl.
CPC ... B64F 5/00 (2013.01); G09B 9/16 (2013.01); G06F 17/30303 (2013.01); G05B 23/027 (2013.01); G05B 23/0272 (2013.01)

(58) Field of Classification Search
CPC .................................................. G06F 9/4881
USPC ......... 340/963, 945, 959, 960, 964, 973, 980; 244/75.1, 180; 701/9, 14, 49; 434/2, 5, 434/49; 342/13, 169; 707/687
See application file for complete search history.

(56) References Cited

U.S. PATENT DOCUMENTS

| | | | | |
|---|---|---|---|---|
| 5,522,026 | A | * | 5/1996 | Records et al. ............... 715/710 |
| 5,549,477 | A | * | 8/1996 | Tran et al. .......................... 434/5 |
| 6,038,498 | A | * | 3/2000 | Briffe et al. ...................... 701/3 |
| 6,043,757 | A | * | 3/2000 | Patrick .......................... 340/963 |
| 2005/0216504 | A1 | * | 9/2005 | Delvat et al. ............. 707/103 R |
| 2011/0193724 | A1 | | 8/2011 | Cases et al. |
| 2011/0219267 | A1 | | 9/2011 | Migliasso et al. |

FOREIGN PATENT DOCUMENTS

FR     2955687 A1     7/2011
FR     2957164 A1     9/2011

* cited by examiner

*Primary Examiner* — Anh V La
(74) *Attorney, Agent, or Firm* — Baker Hostetler LLP

(57) ABSTRACT

A method to develop a system for management of warnings and electronic procedures for an aircraft, comprising a database of parameters relating to the warnings and to logic and procedures, the aircraft comprising ATA equipment, comprises definition and calculation of maturity criteria for development of the system, which comprises, in order: A) verification of warnings in the database with respect to predefined lists of warnings and calculation of a maturity criterion, B) if the criterion of A>predetermined threshold, verification of the coherence of the logic for the warnings then definition and calculation of a maturity criterion, C) if the criterion of B>predetermined threshold, verification of the existence of the procedures and, for each warning, analysis of its logic with respect to its procedure, then definition and calculation of a maturity criterion, the system being fully set up when the latter criterion>predetermined threshold.

3 Claims, 3 Drawing Sheets

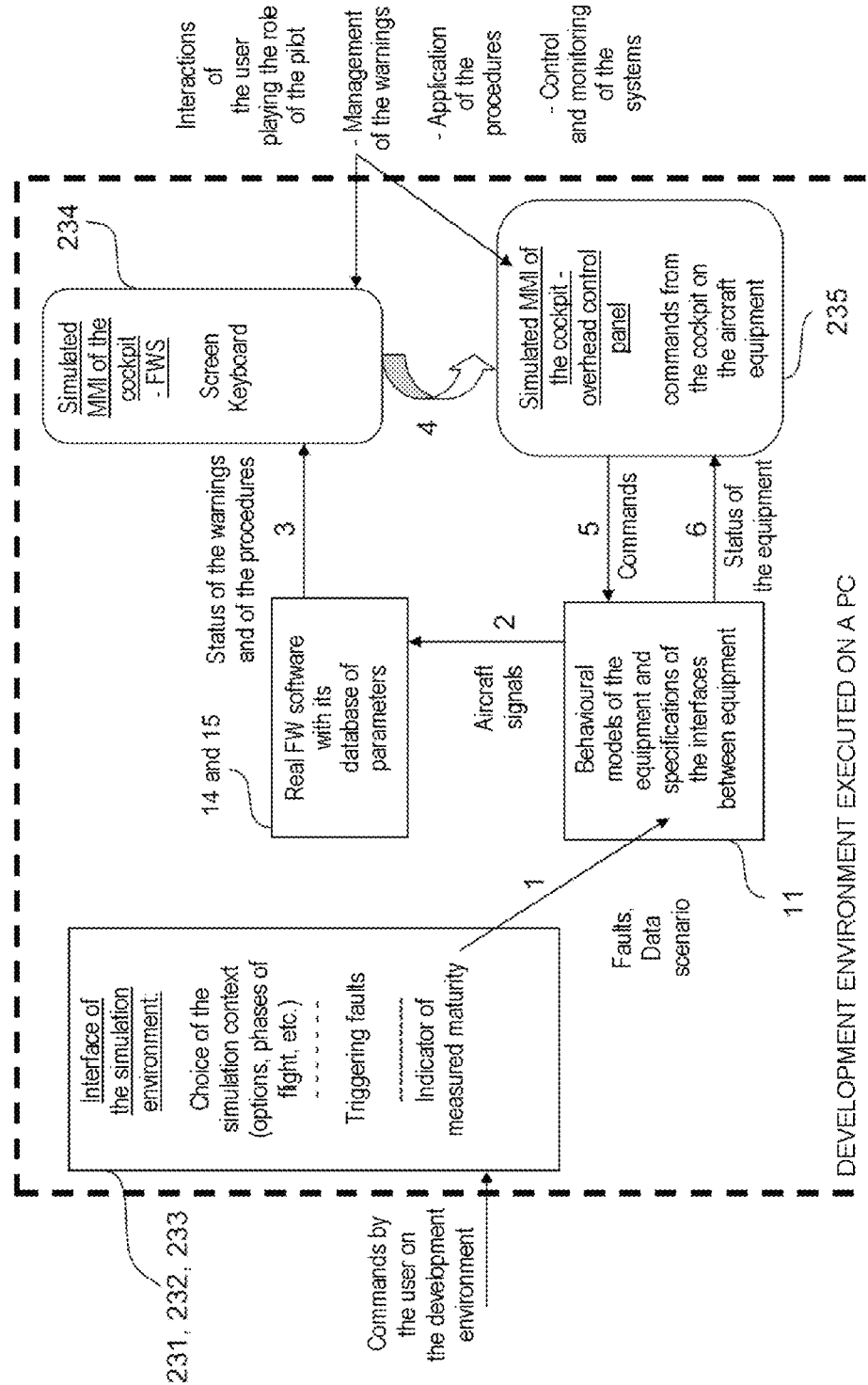

METHOD AND DEVICE FOR DEVELOPMENT OF A SYSTEM FOR MANAGEMENT OF THE WARNINGS AND PROCEDURES ON AN AIRCRAFT

CROSS-REFERENCE TO RELATED APPLICATION

This application claims priority to foreign French patent application No. FR 1201196, filed on Apr. 24, 2012, the disclosure of which is incorporated by reference in its entirety.

FIELD OF THE INVENTION

The field of the invention is that of systems for management of the warnings and of the electronic procedures for an aircraft, also denoted Flight Warning System or FWS, or Crew Alerting System (CAS).

BACKGROUND

The system for management of the warnings and of the electronic procedures for an aircraft is a system at the heart of the aircraft. In view of its functionality, it is connected to virtually all of the electronic equipment on the aircraft, such as the fuel management system, the electrical system or the hydraulic system. This equipment, which is identified by the international commission ATA, acronym for Air Transport Association, (subsequently denoted ATA equipment), evolves in the course of the development of the aircraft depending notably on the interfaces between ATA equipment and on the dynamic behaviour of the signals sent by this ATA equipment. This FWS system indicates to the pilot the procedures to be followed for managing the aircraft, in nominal and abnormal modes. Quantitatively, this system conventionally manages 5000 signals on the aircraft (from which warnings and procedures originate), 1000 warnings aimed at the crew, 1000 procedures attached to these warnings.

The honing of the FWS continues right up to the flights preceding the certification flights.

The FWS is therefore, by reason of its central position, continually modified and updated during the development of the aircraft but especially "in the final straight" prior to the certification.

The development of the FWS, in other words the maturation of its design, is subject to numerous iterations of software development and is currently carried out in an empirical manner based on:

- the knowledge of the behaviours of the various types of ATA equipment, and of the events seriously affecting this equipment and more generally the aircraft, and
- the establishment of standard procedures, and this takes place relatively late in the development planning of the aircraft. Moreover, a large part of the verification of the implementation is carried out on a "complete system test bench" or on the test aircraft itself, blocking these rare resources that are highly solicited elsewhere.

SUMMARY OF THE INVENTION

The aim of the invention is to overcome these drawbacks.

More precisely, the subject of the invention is a method for the development of a system for management of warnings and of electronic procedures for an aircraft. It is mainly characterized in that the system for management of warnings and procedures comprising a database of parameters relating to the warnings and to the logic and procedures associated with these warnings, and the aircraft comprising several types of ATA equipment, the method comprises a step for definition and for calculation of maturity criteria for the development, which comprises, in this order, the following sub-steps:

A1) verification of the warnings in the database for each unit of ATA equipment with reference to a predefined list of indispensible warnings, then definition and calculation of a maturity criterion $C_1$ for this sub-step, A2) if $C_1$>first predetermined threshold, verification that these warnings are complete with respect to a predetermined list of warnings for each unit of ATA equipment, then definition and calculation of a maturity criterion $C_2$ for this sub-step, A3) if $C_2$>second predetermined threshold, verification that these warnings in the database are complete with respect to a predetermined list of general warnings, then definition and calculation of a maturity criterion $C_3$ for this sub-step, B1) if $C_3$>third predetermined threshold, verification of the mutual coherence of the logic for the warnings and time-dependent filtering of the warnings admitted after this verification, then definition and calculation of a maturity criterion $C_4$ for this sub-step, B2) if $C_4$>fourth predetermined threshold, non-nominal states of the aircraft being defined, verification of the coherence of the logic for the warnings as a function of these non-nominal states, then definition and calculation of a maturity criterion $C_5$ for this sub-step, B3) if $C_5$>fifth predetermined threshold, phases of flight of the aircraft being defined, verification of the coherence of the logic for the warnings as a function of the phases of flight and depending on optional equipment on the aircraft, then definition and calculation of a maturity criterion $C_6$ for this sub-step, B4) if $C_6$>sixth predetermined threshold, information being designed to be displayed on a screen of the system for management of warnings and procedures, verification of the coherence of this information with information designed to be displayed on at least one other equipment on the aircraft, then definition and calculation of a maturity criterion $C_7$ for this sub-step, C1) if $C_7$>seventh predetermined threshold, verification of the existence of the procedures and operational verification of the procedures, then definition and calculation of a maturity criterion $C_9$ for this sub-step, C2) if $C_9$>ninth predetermined threshold, for each warning, analysis of its logic with respect to its procedure, then definition and calculation of a maturity criterion $C_{10}$ for this sub-step, the system for management of warnings and procedures being fully set up when $C_{10}$>tenth predetermined threshold.

These sub-steps guide the user responsible for the development in a progressive manner so as to carry out the verifications in an optimum order in terms of workload and with regard to the overall process of development of an aircraft, while at the same time defining measurable criteria specific to the FWS, which allow the user to measure the current state of maturity, without having to resort to real trials on the aircraft or on the test bench except as a last resort.

Preferably, the method furthermore comprises, following the steps A and B, a sub-step B5) for validation of the parameters of the database on the aircraft or on a test bench under real conditions, then definition and calculation of a maturity criterion $C_8$ for this sub-step.

Another subject of the invention is a device for setting up a system for management of warnings and electronic procedures for an aircraft comprising equipment, characterized in that it comprises a simulator comprising:
- a unit for storing data files and executable application files, the data files being:
  - a file with the behavioural models of the equipment on the aircraft, including the specifications of each unit of equipment,
  - a predetermined list of warnings for each unit of equipment,
  - a predetermined list of general warnings,
  - a database of parameters,
  the executable applications being:
  - a certified application of a system for management of warnings and procedures, and
  - an application for the development of the system for management of warnings and procedures, designed to implement the method such as described hereinabove,
- man-machine interfaces comprising a mouse and/or a keyboard and a screen for displaying information coming from the development application, and for inputting simulation commands and information for the development application, in cooperation with the mouse and/or the keyboard,
- a central processing unit, connected to the storage unit and to the man-machine interfaces, designed to execute the executable applications.

BRIEF DESCRIPTION OF THE DRAWINGS

Other features and advantages of the invention will become apparent upon reading the detailed description that follows, presented by way of non-limiting example and with reference to the appended drawings in which:

FIG. 3 shows schematically one example of use of a device for development of an FWS according to the invention.

From one figure to another, the same elements are identified by the same references.

DETAILED DESCRIPTION

Figure 1:
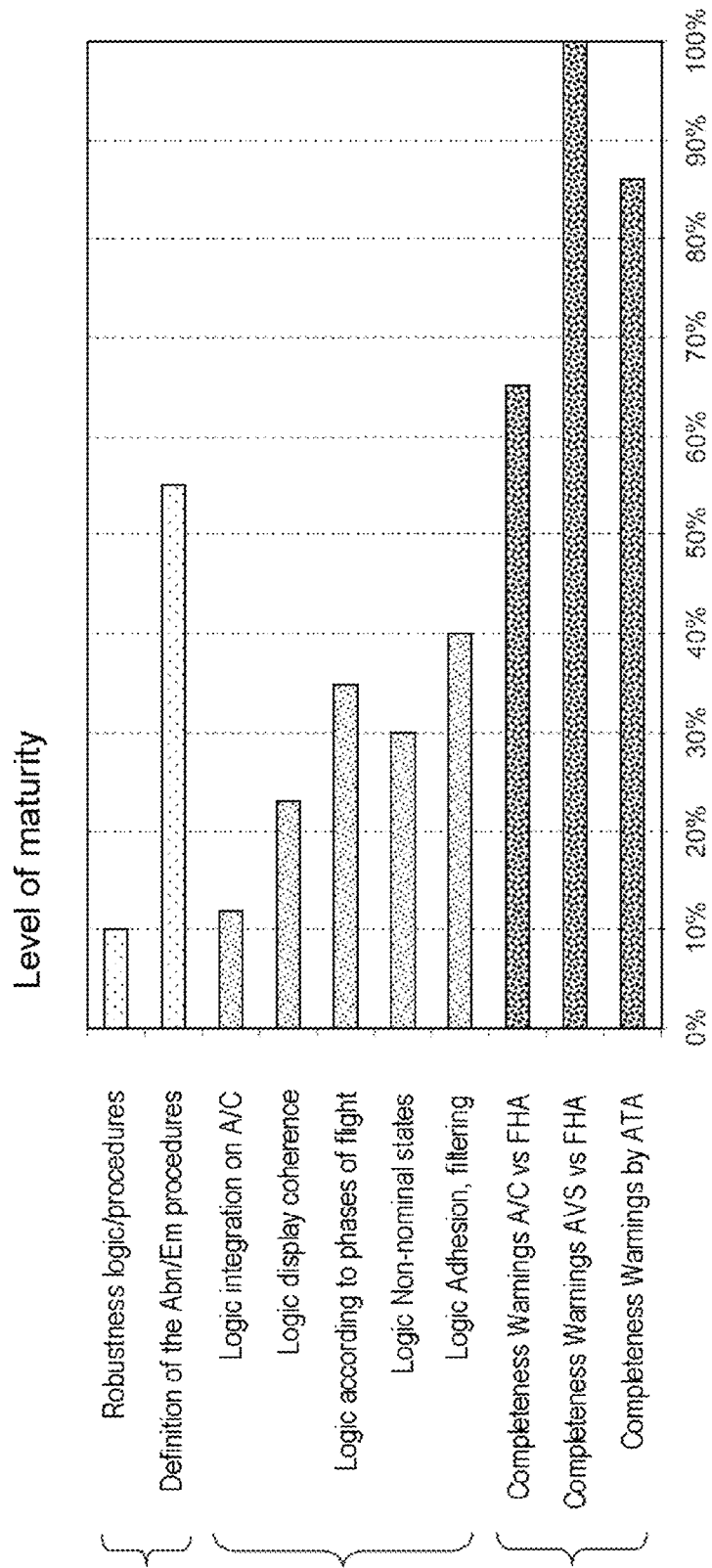
FIG. 1 is one example of presentation of the maturity level of the development of the FWS in the form of maturity criteria for each sub-step expressed as a percentage of maturity.

The method for development of the FWS according to the invention comprises a step allowing the user to measure the state of maturity of this development. This step itself comprises sub-steps which guide the user in a progressive manner, so as to carry out the verifications in an optimum order in terms of workload and with regard to the overall process of development of the aircraft, while at the same time defining and calculating, for each sub-step, a measurable maturity criterion. One example of these criteria is presented in FIG. 1.

Three categories of sub-steps are differentiated depending on whether they relate to:
- A) The completeness of the warnings,
- B) Their mutual coherence or with respect to various states or phases of flight of the aircraft,
- C) The coherence of each warning with its procedure.

These sub-steps, which are performed in the following order, will now be detailed.

A) Completeness of the warnings.

A1) Verification for each unit of ATA equipment that all the warnings in the database are well defined and characterized with respect to a predefined list of indispensible warnings such as those listed in the circular CS25 or in any other list of the required minimum. Then, definition and calculation of a maturity criterion C1 for this sub-step also denoted implementation criterion for this sub-step. This criterion C1 is for example defined by: number of warnings defined and characterized/number of indispensible warnings.

A2) if C1>first predetermined threshold, verification that these warnings are complete with respect to a predetermined list of warnings for each unit of ATA equipment, referred to as FHA list, acronym for "Fault Hazard Analysis", specific to the airframe manufacturer: in practice, it amounts to justifying the non-presence of a warning with respect to this list. Then, definition and calculation of a maturity criterion C2 for this sub-step. This criterion C2, which may be divided up into as many criteria as the number of units of ATA equipment, is for example defined by:

number of warnings defined for each unit of ATA equipment/number of warnings in the FHA list for each unit of ATA equipment.

A3) if C2>second predetermined threshold, verification that these warnings are complete with respect to a predetermined list of warnings for the aircraft referred to as FHA list specific to the aircraft: in practice, it amounts to justifying the non-presence of a warning with respect to this list. Then definition and calculation of a maturity criterion C3 for this sub-step. This criterion C3 is for example defined by:

overall number of warnings defined for the aircraft/overall number of warnings in the FHA list for the aircraft.

These three criteria C1, C2, C3 are calculated automatically by the device for development of the FWS described hereinbelow.

B) Coherence of the conditions of application of a warning; as these conditions are expressed in the form of Boolean logic, this is also referred to as coherence of the definition of the logic for the warnings.

B1) if C3>third predetermined threshold, verification of the mutual coherence of the logic for the warnings. Here, the common modes are automatically analyzed by pairs of warnings on the events triggering them, as far as the elimination of the undesirable common modes (double usage); the idea of adhesion between warnings is also considered in the case of multiple faults for example, and of time-dependent filtering on the duration of the warning.

Then, definition and calculation of a maturity criterion C4 for this sub-step; this is typically a declarative criterion indicating the ratio between the number of faults tested and the number of exclusions identified. These exclusions are determined according to the "number of redundancies in the equipment" and to the criticality of the warnings. This criterion will be informed by the user responsible for the development of the FWS or automated (as for C1, C2 or C3).

B2) if C4>fourth predetermined threshold, verification of the coherence of the logic for the warnings with respect to the non-nominal states of the aircraft (transient states of the aircraft: engine starts, electrical faults, etc.). This is an exoneration sub-step aiming to detect the spurious disabling of warnings during transient phases and to eliminate these transient states by time-dependent simulation with the behavioural models of the ATA equipment. In the take-off phase for example, certain warnings are masked because they do not require any immediate action by the pilot. Then, definition and calculation of a maturity criterion C5 for this sub-step. C5, which is for example defined by comparison of the warnings with regard to an expected state determined by the user responsible for the setting up of the FWS, is a declarative criterion indicating the ratio between the number of non-nominal states tested—validated and the number of problematic non-nominal states that will be informed by the user or automated.

B3) if C5>fifth predetermined threshold, verification of the coherence of the logic for the warnings with respect to the phases of flight of the aircraft and potentially with respect to any optional equipment installed: definition of different procedures for the same fault depending on the current phase of flight and/or depending on the optional equipment. Then, definition and calculation of a maturity criterion C6 for this sub-step. This criterion C6 is for example a declarative binary criterion that will be informed by the user when this sub-step is carried out. It could also be automated.

B4) if C6>sixth predetermined threshold, verification of the semantic coherence (generally visual in the form of a colour and potentially audible) of the warnings displayed with respect to other information displayed (PFD, system pages). In other words, the aim is an automatic analysis of coherence in terms of level of warning for the various visual and audible messages in the cockpit, based on the input parameters. When, for example, the information on speed is no longer available, a warning "Speed Fault" is displayed on the FWS screen: is it coherent with the speed displayed on the screen displaying the primary flight parameters, denoted "Primary Flight Display" ? Then, definition and calculation of a maturity criterion C7 for this sub-step. This criterion C7 is for example a declarative criterion which will be informed by the user or automatically, after comparison of the parameters of the database (the colour for example) with those of the other information displayed.

B5) Preferably, if C7>seventh predetermined threshold, integration onto the aircraft or onto a test bench for verification under the real conditions and final 'fine tuning' of the FWS: for example, verification of the interdependent timing aspect of the parameters of the aircraft (e.g.: Warning with A=1 and B=1 whereas, in practice, A is never equal to 1 at the same time as B). Then, definition and calculation of a maturity criterion C8 for this sub-step. This criterion is for example a declarative criterion which indicates that the warning has been reviewed and has been validated operationally under real conditions. This criterion will be informed by the user depending on the state of progress of this sub-step.

C) Coherence of each set of logic with regard to its procedure.

C1) if C7>seventh predetermined threshold, automatic verification of the existence of a required procedure in the database of the parameters. Each procedure is subsequently operationally validated. Then, definition and calculation of a maturity criterion C9 for this sub-step. This criterion is for example a declarative criterion which guarantees that the procedure has been reviewed and has been operationally validated. This criterion will be informed by the user.

C2) if C9>ninth predetermined threshold, analysis of the logic for the warnings with respect to its procedure (e.g.: one of the actions in the procedure disables the warning whereas the procedure is not finished), then launch of a simulation scenario chosen from amongst a predetermined list of scenarios. Then, definition and calculation of a maturity criterion C10 for this sub-step. C10 is for example the rate of simulation with no anomaly, and it is automatically calculated by the device for development of the FWS.

The predetermined thresholds are determined experimentally by the user according to his experience or by the supplier of the device for development of the FWS.

This development device is composed of a certified FWS application which will be installed on the aircraft, of the database of configuration parameters, of a set of behavioural models representative of the real equipment on the aircraft, and of an information system environment user interface allowing the majority of the ATA equipment and general verifications to be carried out, such as required by the standard ARP 4754.

Figure 2:
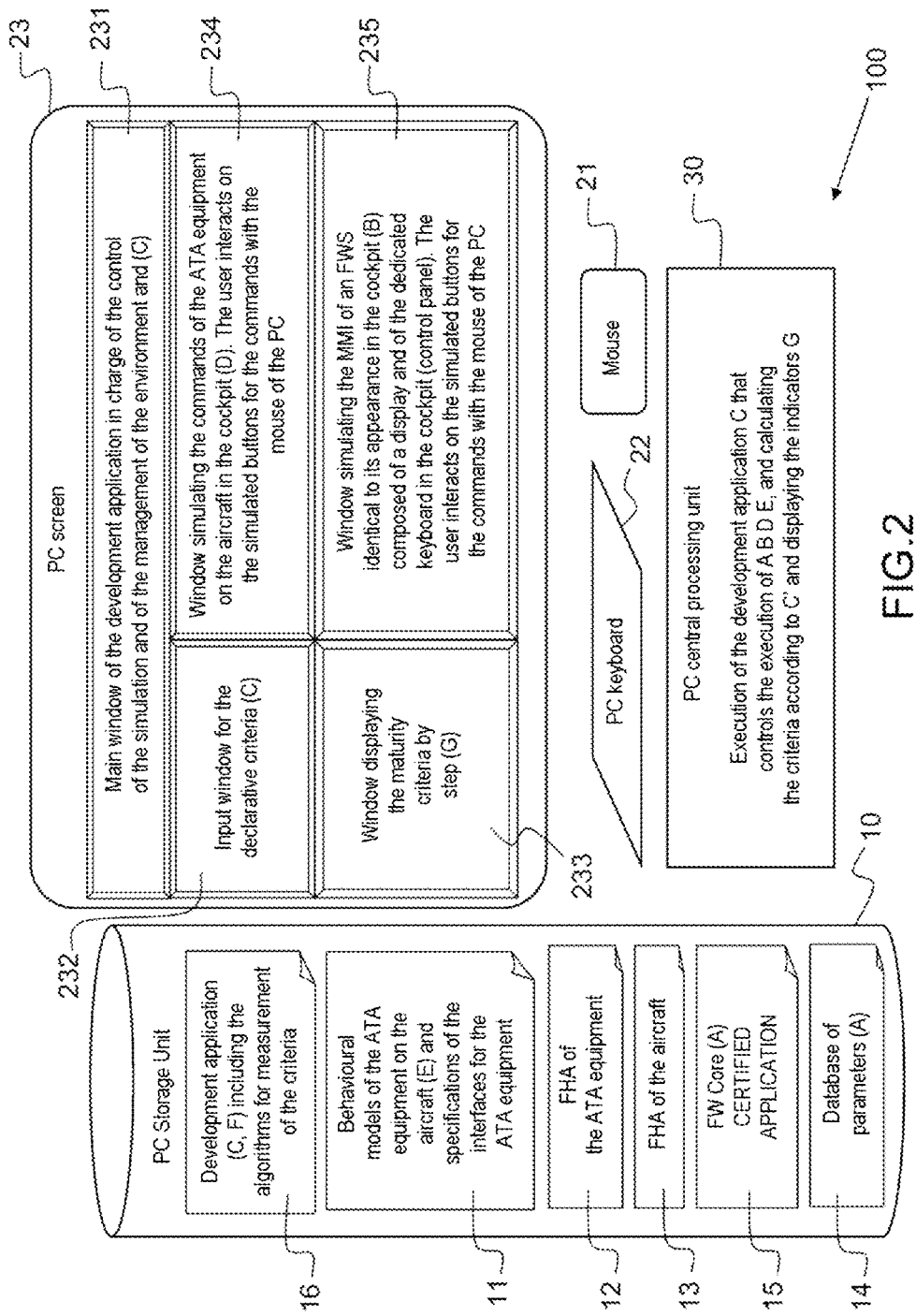
FIG. 2 shows schematically one example of a device for development of an FWS according to the invention.

Such a device 100 for development of a system for management of warnings and of electronic procedures for an aircraft will be described with reference to FIG. 2. This development device is a hybrid device in the sense that it uses both real information (warnings, logic, procedures and executable FWS application certified by a certification authority) and simulated information (behavioural models).

The device is a PC conventionally comprising:
 a storage unit 10 for data files and for executable application files,
 man-machine interfaces comprising a mouse 21 and/or a keyboard 22 and a screen 23 for displaying information and for inputting commands and parameters, in cooperation with the mouse and/or the keyboard,
 a central processing unit 30 connected to the storage unit and to the man-machine interfaces, designed to execute the executable applications.

According to the invention, the data files are:
 a file 11 with the behavioural models of the ATA equipment on the aircraft, which includes the specifications of the interfaces between units of equipment, these models and specifications being pre-established by the airframe manufacturer,
 a predetermined list 12 of warnings for each unit of ATA equipment, such as an FHA list,
 a predetermined list 13 of general warnings, such as an FHA list,
 a database of parameters 14 for the warnings, of their logical relationships, of the procedures and of the signals, pre-established by the airframe manufacturer.

From amongst the parameters of this database, the following may be mentioned:
 The audible warnings with, for each sound, its duration, its volume, its repetitive properties.
 The phases of flight in the form of a binary decision tree, with the phases of flight and the logic of the decision nodes of, and definition of a validity of the phase of flight that is robust to a partial unavailability of the inputs to the logic of the decision nodes.
 The warnings with, for each warning, the event triggering it, the visual and audible warning means, its priority, the text message, the type of warning, the prohibitive phases of flight, the prohibitive contexts, the associated procedure.
 The events triggering these warnings with, for each event, the list of logic signals of the aircraft with their law for de-formatting (in other words a change of the raw format from a complex signal into several signals each expressed in a usable format) and for mutual consolidation of the signals, the sequencing table of the operations transforming the list of signals and of contexts into a triggering event.

The logic signals of the aircraft with, for each logic signal, the list of signals of the aircraft with their de-formatting and consolidation law.

The contexts with, for each context, the list of signals of the aircraft with their de-formatting and consolidation law, the sequencing table of the operations transforming the list of signals into a context.

The procedures with, for each procedure, its title, its type, its position in the menu, the list of attached procedures, the list of auto-completed procedures, the content of the procedure.

The content of a procedure with its composition in pages and action(s) to be performed (also denoted item).

The item with its category, its text content, its graphics style, its attached system page, the auto-acknowledgement event.

The menu with for each line, a sub-menu or a procedure title.

For each of these parameters, the number of instances is fixed together with an authorized range of values.

The executable applications are:
an FWS application 15 with prior certification by a certification authority such as for example the EASA, acronym for "European Aviation Safety Agency",
an application for development of the FWS 16 designed to implement the method such as previously described.

Information of various types are displayed preferably in various display windows of the screen 23:
a first window 231 is reserved for the development application and is used to launch this application or only certain steps potentially inputting a simulation context (phase of flight, optional equipment, etc.), triggering a fault to be tested, etc.,
a second window 232 is typically reserved for the display of the maturity criteria C1 to C10 as illustrated in FIG. 1,
a third window 233 for inputting the declarative criteria (C4, C5, C6, C8, C10 previously mentioned) to be informed by the user,
a fourth window 234 for inputting simulated commands for the ATA equipment on the aircraft in the cockpit: the user interacts on the simulated buttons of the controls with the mouse of the PC,
a fifth window 235 simulating the MMI of an FWS identical to its appearance in the cockpit, composed of a display and of the dedicated keyboard in the cockpit (control panel): the user interacts on the simulated buttons of the control panel with the mouse of the PC.

During the application of the development method according to the invention, when an anomaly relating to a warning and/or to its logic and/or to its procedure is detected, the database 14 of parameters can be modified by the user, the other files not being modified because they are stable.

The device is typically used in the following manner described with reference to FIG. 3.

The user responsible for setting up the FWS inputs into the PC a simulation command, via the first window 231 on the screen and the keyboard 22 and/or the mouse 21. This is, for example, the choice of a simulation context (phase of flight, optional equipment, etc.), the triggering of faults on a unit of ATA equipment or the stimulations of signals of the aircraft. The user inputs, for example, a fault relating to an overheating of the pump n° 3 in a phase of flight.

Depending on these faults (overheating of the pump n° 3) and on the context (phase of flight) (=arrow 1 in the figure), a model of the behaviour of the equipment in question is identified in the file 11 with the behavioural models of the equipment on the aircraft; signals are sent based on this model to the FWS application 15 (=arrow 2 in the figure).

Depending on these signals, and on the parameters associated with these signals which are stored in the database 14 of parameters, the FWS application 15 generates warnings and the procedures attached to these warnings (=arrow 3 in the figure), which are displayed in the fifth window 235 of the screen, as they would be displayed under real conditions for the attention of the pilot on a screen in the cockpit of the aircraft. The following may for example appear on the screen: the warning "danger pump n° 3", the procedure displayed being "switch off pump n° 3 and enable the relay".

The user who also plays the role of the pilot manages the warnings by applying the corresponding procedures (=arrow 4 in the figure) which generally result in a command to be activated on a simulated control panel of the cockpit displayed on the screen in the fourth window 234, and intended for a unit of equipment on the aircraft. In the present example, the user must therefore switch off the pump n° 3 and enable the relay. This command, which is generated via the keyboard 22 and/or the mouse 21 of the PC, is transmitted to the file 11 with behavioural models for the equipment on the aircraft (=arrow 5 in the figure) which return to the simulated panel a state of the equipment in question subsequent to this action, this being in the present example: "pump n° 3 off, relay enabled" (=arrow 6 in the figure).

The invention claimed is:

1. A method for development of a system for management of warnings and electronic procedures for an aircraft, the system comprising a database of parameters relating to warnings and to logic and procedures associated with these warnings, the aircraft comprising several types of equipment being ATA equipment, the method comprising a step for definition and for calculation of maturity criteria for the development of the system for management of warnings and procedures, which comprises, in order, the following sub-steps:

A1) verification of the warnings in the database for each unit of ATA equipment with respect to a predefined list of indispensible warnings, then definition and calculation of a maturity criterion C1 for this sub-step, A2) if C1>first predetermined threshold, verification that these warnings are complete with respect to a predetermined list of warnings for each unit of ATA equipment, then definition and calculation of a maturity criterion C2 for this sub-step, A3) if C2>second predetermined threshold, verification that these warnings of the database are complete with respect to a predetermined list of general warnings, then definition and calculation of a maturity criterion C3 for this sub-step, B1) if C3>third predetermined threshold, verification of the mutual coherence of the logic for the warnings and time-dependent filtering of the warnings admitted after this verification, then definition and calculation of a maturity criterion C4 for this sub-step, B2) if C4>fourth predetermined threshold, non-nominal states of the aircraft being defined, verification of the coherence of the logic for the warnings as a function of these non-nominal states, then definition and calculation of a maturity criterion C5 for this sub-step, B3) if C5>fifth predetermined threshold, phases of flight of the aircraft being defined, verification of the coherence of the logic for the warnings as a function of the phases of flight of the aircraft and depending on optional equipment on the aircraft, then definition and calculation of a maturity criterion C6 for this sub-step, B4) if C6>sixth predetermined threshold, information being designed to be displayed on a screen of the system for management of warnings and procedures, verification of the coherence of this information with information designed to be displayed on at least one other equipment on the aircraft, then definition and calculation of a maturity criterion C7 for this sub-step, C1) if C7>seventh predetermined threshold, verification of the existence of the procedures and operational verification of the procedures, then definition and calculation of a maturity criterion C9 for this sub-step, C2) if C9>ninth predetermined threshold, for each warning, analysis of its logic with respect to its procedure, then definition and calculation of a maturity criterion C10 for this sub-step, the system for management of warnings and procedures being fully set up when C10>tenth predetermined threshold.

2. A method for the development of a system for management of warnings and of electronic procedures according to claim 1, further comprising, following steps A and B, a sub-step B5) for validation of the parameters in the database on the aircraft or on a test bench under real conditions, then definition and calculation of a maturity criterion C8 for this sub-step.

3. A device for development of a system for management of warnings and electronic procedures for an aircraft comprising equipment, comprising a simulator comprising:

a unit for storage of data files and of executable application files, the data files being:

a file with the behavioural models of the equipment on the aircraft, including the specifications for each unit of equipment, a predetermined list of warnings for each unit of equipment, a predetermined list of general warnings, a database of parameters, the executable applications being:

a certified application of a system for management of warnings and procedures, and an application for development of the system for management of warnings and procedures designed to implement the method according to claim 1, man-machine interfaces comprising a mouse and/or a keyboard and a screen for displaying information coming from the development application, and for inputting simulation commands and information for the development application, in cooperation with the mouse and/or the keyboard, and a central processing unit connected to the storage unit and to the man-machine interfaces, designed to execute the executable applications.

* * * * *